United States Patent [19]

Barton et al.

[11] Patent Number: 4,787,077

[45] Date of Patent: Nov. 22, 1988

[54] PROCESS FOR OPTICALLY STORING INFORMATION USING MATERIALS HAVING A SINGLE PHASE IN BOTH THE CRYSTALLINE STATE AND THE AMORPHOUS STATE

[75] Inventors: Roger W. Barton, Menlo Park; Martin Y. Chen, San Jose; Charles R. Davis, San Jose; Grace L. Gorman, San Jose; Vincent Marrello, Morgan Hill; Kurt A. Rubin, Santa Clara, all of Calif.

[73] Assignee: International Business Machines Corporation, Armonk, N.Y.

[21] Appl. No.: 90,636

[22] Filed: Aug. 28, 1987

Related U.S. Application Data

[63] Continuation-in-part of Ser. No. 766,160, Aug. 15, 1985, abandoned.

[51] Int. Cl.$^4$ .......................... G11C 13/02; G11B 7/24
[52] U.S. Cl. .................................... 369/100; 369/275; 369/288; 369/284; 365/113; 430/945
[58] Field of Search ............... 369/100, 275, 284, 288; 365/113, 106, 120, 127; 346/1.1, 135.1, 76 L; 430/945

[56] References Cited

U.S. PATENT DOCUMENTS

| | | | |
|---|---|---|---|
| 3,801,966 | 4/1974 | Terao | 365/106 |
| 3,868,651 | 2/1975 | Ovshinsky | 365/113 |
| 4,587,533 | 5/1986 | Nakane et al. | 430/945 |
| 4,633,273 | 12/1986 | Watanabe et al. | 346/135.1 |
| 4,645,712 | 2/1987 | Ishigaki et al. | 346/135.1 |
| 4,647,944 | 3/1987 | Gravesteijn et al. | 346/135.1 |
| 4,670,345 | 6/1987 | Morimoto et al. | 346/135.1 |
| 4,710,452 | 12/1987 | Raychaudhuri | 346/135.1 |

FOREIGN PATENT DOCUMENTS 60-257291  12/1985  Japan .................... 430/945

OTHER PUBLICATIONS

Watanabe et al, The SPIE, vol. 382, The International Society for Optical Engineering, pp. 191-195.
Wieder, IBM Tech. Disc. Bull., vol. 25, No. 1, 6/1982, p. 440.

Primary Examiner—Raymond F. Cardillo
Assistant Examiner—Hoa T. Nguyen
Attorney, Agent, or Firm—Joseph G. Walsh

[57] ABSTRACT

An optical storage system has an information containing film of a material which has a crystallization temperature between 100° C. and 400° C. and can be switched between the amorphous and the crystalline states. Both the amorphous and crystalline states are substantially a single phase where the stoichiometric ratio of the material remains unchanged. Spots on the film is heated with a circular laser beam with a controlled pulse duration and intensity to melt the material in the spots. The spots are quenched at one rate to produce the amorphous state, and in a second revolution of the disk, at a different rate to produce the crystalline state.

4 Claims, 1 Drawing Sheet

PROCESS FOR OPTICALLY STORING INFORMATION USING MATERIALS HAVING A SINGLE PHASE IN BOTH THE CRYSTALLINE STATE AND THE AMORPHOUS STATE

The present application is a continuation-in-part of copending application Ser. No. 06/766,160 filed Aug. 15, 1985 now abandoned.

DESCRIPTION

1. Technical Field

This invention relates to optical storage and more particularly to a process for forming optical storage systems in which the phase change between the amorphous and the crystalline phases occurs very rapidly.

2. Background Art

The patent to Ovshinsky, U.S. 3,530,441, describes the use of transitions between amorphous and crystalline states in a semiconductor material to store information or data. An example of a memory semiconductor material contains about 85% tellurium and 15% germanium in atomic percent with inclusions of some oxygen and/or sulfur. The state of these amorphous materials can be changed by applying electrical, optical or thermal energy thereto. In one state such material has a so-called non-crystalline or amorphous bulk structure which has a low optical density. In the other state, the material has a crystalline structure which has a relatively high optical density.

The patent of Ohta et al, U.S. 3,971,874, describes the use of a transition between amorphous and crystalline states in a tellurium oxide film. Again, the non-crystalline structure has a low otical density and the crystalline structure has a relatively high optical density. Ohta et al, U.S. 4,091,171, describes a transition between amorphous and crystalline states in Ge, Sn, Sb, Tl, Bi and Mo sub-oxide. Ohta et al, U.S. 4,278,734, covers transitions between amorphous and crystalline states in metal or semimetal sub-oxide. In all of the Ohta et al patents, the change in optical density occurs when the phase changes from amorphous to crystalline.

In the "phase change" scheme for optical recording in the systems described in the aforementioned patents, a laser beam is used to heat a material and switch it alternately between an amorphous and a crystalline state. Typically, a short intense laser pulse, for example, pulse of 12 mW power and 50 nsec duration, is used for writing which melts the material and allows it to quench into an amorphous or and atomically disordered state.

For erasing (of a stationary spot), a longer pulse, for example, of 4 mW power and 10 μsec duration, is employed, allowing the material to relax into its lower energy crystalline state.

The erasing step for a particular medium is commonly characterized by the minimum pulse width of the laser beam required for crystallization. With prior art materials, the minimum crystallization pulse width for erasing is between 1,000 ns and 80,000 ns. In typical optical recording systems, a disk is coated with a film of the storage material. Because the disk is rotated with a high velocity (at least 4 microns per microsecond), each spot on the disk is exposed to the erase laser beam, during each revolution of the disk, for only a time period equal to the transit time of the spot under the erase beam, even if the erase laser is turned on continuously. With 4 microns per microsecond disk velocity, a material with a 1,000 ns minimum crystallization pulse width requires a 4 micron-long erase laser spot. As a result, prior art systems require two laser beams, one laser beam of 1 micron size for writing purposes and a second elliptical beam >4 microns long for erasing purposes.

Watanabe et al, SPIE (The International Society for Optical Engineering), Vol. 382, Jan. 1985, pages 191–195, shows a process for writing only once. The process of that reference does not teach quenching at two different rates.

SUMMARY OF THE INVENTION

The present invention provides materials and a process for optical storage. It uses a material which has a crystallization temperature between 100° C. and 400° C. and which can be switched between the amorphous state and the crystalline state, and in which both states are substantially of a single phase with the same stoichiometric ratio, with the amorphous state and the crystalline state having different optical properties. A spot on a film (typically from 200 to 1,000 Angstroms thick) of such a material is heated with a laser beam to melt the material in said spot, whereby cessation of the laser radiation causes the material in said spot to quench at a suitable rate to produce the desired state.

DESCRIPTION OF THE DRAWINGS

Understanding of the invention will be facilitated by reference to the drawings.

DETAILED DESCRIPTION OF THE PREFERRED EMBODIMENTS

Figures 1, 2:
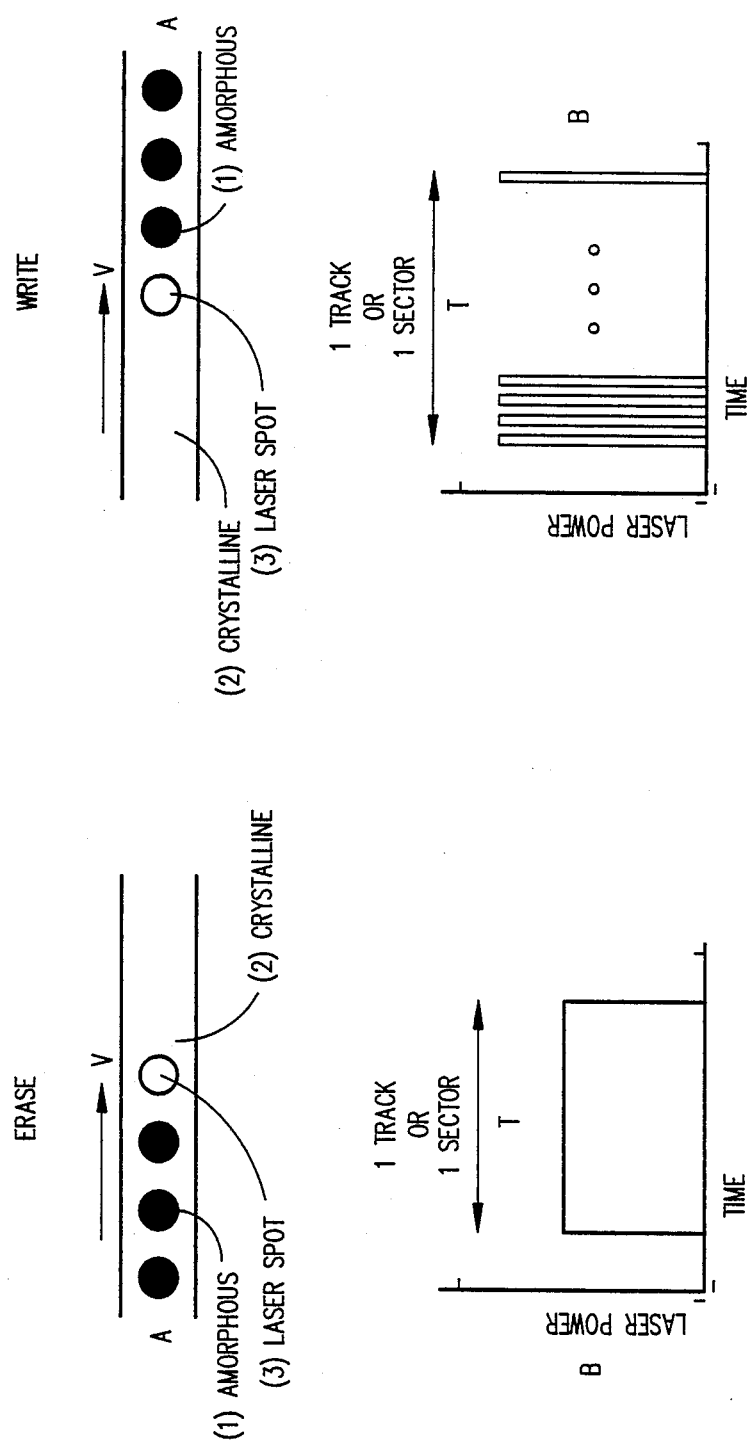
FIG. 1 is a drawing, not to scale, showing a portion of a track on a storage disk in (A) and a graph (B) of a plot of the laser intensity versus time, both while the erase operation is taking place.
FIG. 2 is a drawing, not to scale, showing a portion of a track or a storage disk in (A) and a graph (B) of a plot of the laser intensity versus time, both while the write operation is taking place.

In both figures, the solid black spots (1) represent amorphous material. The white spaces (2) represent crystalline material. The hollow circles (3) represent the laser spots.

The materials of the present invention have the ability to crystallize in <300 ns, the transit time of a spot on the disk under a 1 μm laser spot for realistic disk velocities. Thus, these materials can be erased in a single rotation of the disk using a 1 μm laser beam. Only one laser, providing a 1 μm circular spot on the disk, is needed in the recording head to perform both erasure and writing, as illustrated in FIG. 1. To erase, the laser is turned on continuously while the track or the sector (a portion of a track) to be erased passes under the laser beam at velocity v. The laser on-time is the transit time, T, of the track or sector under the laser spot. This causes previously recorded, amorphous spots on said track or sector to crystallize or to be erased. Writing in the erased track or sector is performed in a second revolution of the disk. Short laser bursts (50 to 200 ns long) at the desired time during T is supplied to the disk and selected spots are amorphized or recorded by the laser. With slower erasing materials of the prior art, the erase beam spot must be elliptical and must be provided through a laser different from the write laser.

Alternatively, this invention allows, in a simple fashion, two laser beams to be employed in the recording head: one for erasure and one for writing; i.e. the erase and the write spot in FIG. 1 may be introduced by the recording head onto the disk side-by-side simultaneously. When the recording material can be erased in less than 300 ns, each beam may be 1 μm in diameter. These two identical beams can be produced simultaneously in a laser array. With well-known integrated circuit manufacturing processes, such a two-laser array can be made with only marginal additional cost over a single laser chip. Furthermore, the substitution of such a laser diode array for a conventional one-laser chip in the fabrication of a recording head would be simple and straight forward. Erase followed immediately by recording during a single revolution of the disk would be possible with this two-laser approach. With slower erasing materials, the erase beam must be elliptical. To provide a circular and an elliptical beam in a recording head, either different laser diodes or two identical diodes with very different attached optics must be used. This adds considerable complexity and cost to the design of the recording system.

In summary, using the materials and the process of the present invention, "phase change" optical recording is accomplished using only circular laser spot(s).

The other requirement for a material besides a short erase time is that the material must be stable in the amorphous state, i.e., the materials must have a relatively high crystallization temperature such as above 100° C. If the materials crystallize at temperatures below 80° C., they are unacceptable, whereas if they crystallize between 100° C. and 400° C., they can have the desired stability.

Materials for use in the process of the present invention include, for example, GeTe, GeTe with small amounts of additional elements (such as $(GeTe)_{85}Sn_{15}$), $(GeTe)_{100-x}Sn_x$ where x is between 0 and 30), GeTe with isoelectronic substitutions (such as $Te_{50}Ge_{(50-x)}Sn_x$ or $Te_{50}Ge_{(50-x)}Si_x$), InSb, and $(Insb)_{1-x}Ge_x$, where x is between 0 and 10, $In_xGa_{(50-x)}Sb_{50}$, $Sb_2Se$, and $Sb_{(1-x)}Se$ where x is between 0 and 40, and any of the following: SnTe, PbTe, SbSe, $Sb_2Se_3$, $Bi_2Se$, $Bi_2Se_3$, $Bi_2Te$, BiTe, $Bi_2Te_3$, $Sb_2Te$, SbTe, $Sb_2Te_3$, TeSi, $Ag_2Se$, $AgSe_2$, $Ag_2Te$, $Ag_3Te_2$, $AgTe_2$, $Au_2Se_3$, $AuTe_2$, GeSe.

The material $(GeTe)_{85}Sn_{15}$ has been deposited on poly-methylmethacrylate (PMMA) substrates and tested for its suitability as an optical recording medium. The active layer was typically 75 nm thick and sandwiched between 250 nm layers of ZnS or 7059 (Corning) glass used for ablation protection and thermal isolation. 2.5 MHz carrier signals were recorded on this disk and, on playback, showed carrier to noise levels of up to 56 dB (using 30 kHz bandwidth). The laser pulses employed for writing were 18 mW in power, 55 nsec in duration, and one micrometer in width. These signals could be completely erased in one disk revolution with a constant power (10 mW) and continuous (for one revolution of 100 ms) laser beam of 10 mW power focused to the same one micron spot. With disk rotations of 600 rpm, the dwell time of the laser spot on the medium was as short as 200 nsec. The tracks could be repeatedly written and erased 1,000 times with no degradation in signal-to-noise ratio. One micron spot written onto glass coupon samples was subjected to heat stress tests. No degradation in spot size was observed after six months at 110° C. The active layer $(GeTe)_{85}Sn_{15}$, then, is an amorphous to crystalline "phase change" optical recording medium that has very good data stability combined with extremely short erase time.

What is claimed is:

1. A process for optically storing information comprising the steps of:
   (1) depositing a film of a material which is selected from the group consisting of GeTe, and GeTe with small amounts of an additional element, and
   (2) heating spots in said film using a controlled laser beam with controlled duration and intensity to melt the material in said spots, and
   (3) quenching the spots at one rate to produce the amorphous state, and in a second revolution of the disk at a different rate to produce the crystalline state.

2. A process as claimed in claim 1 wherein the material is $(GeTe)_{85} Sn_{15}$.

3. A process as claimed in claim 1 wherein the material is $(GeTe)_{100-x}Sn_x$ where x is between 0 and 30.

4. A process as claimed in claim 1 wherein the film is about 200 to 1,000 Angstroms thick.

* * * * *